July 9, 1974  L. HARGETT  3,823,052
QUILTED FABRIC AND METHOD OF PRODUCING THE SAME
Original Filed Oct. 1, 1969  2 Sheets-Sheet 1
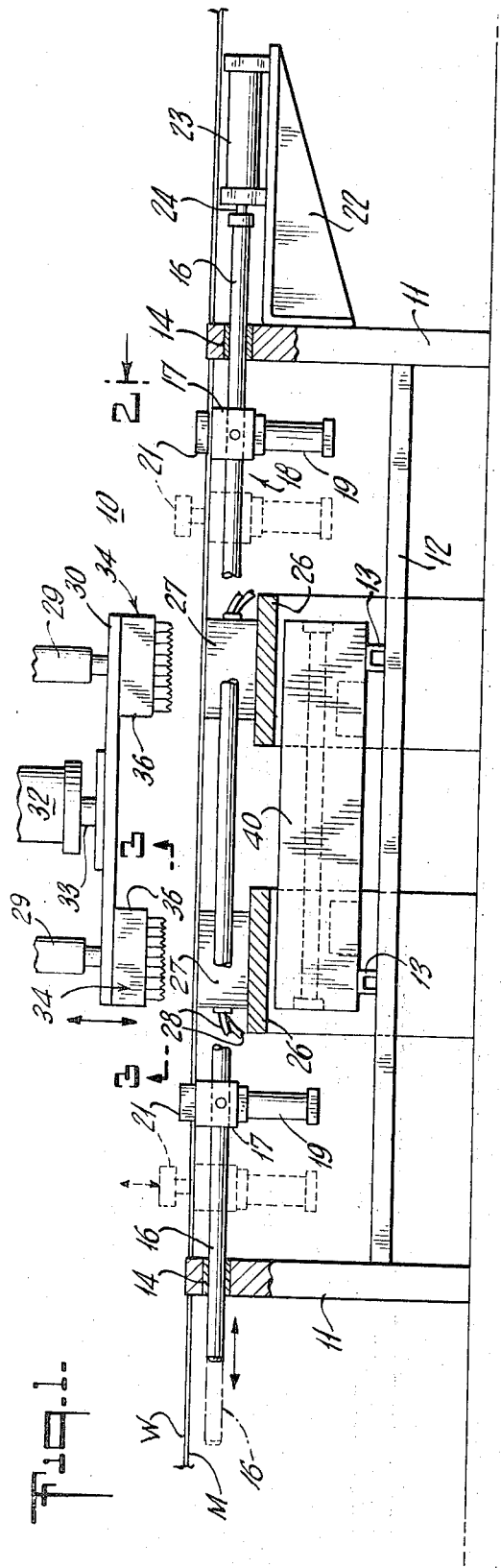
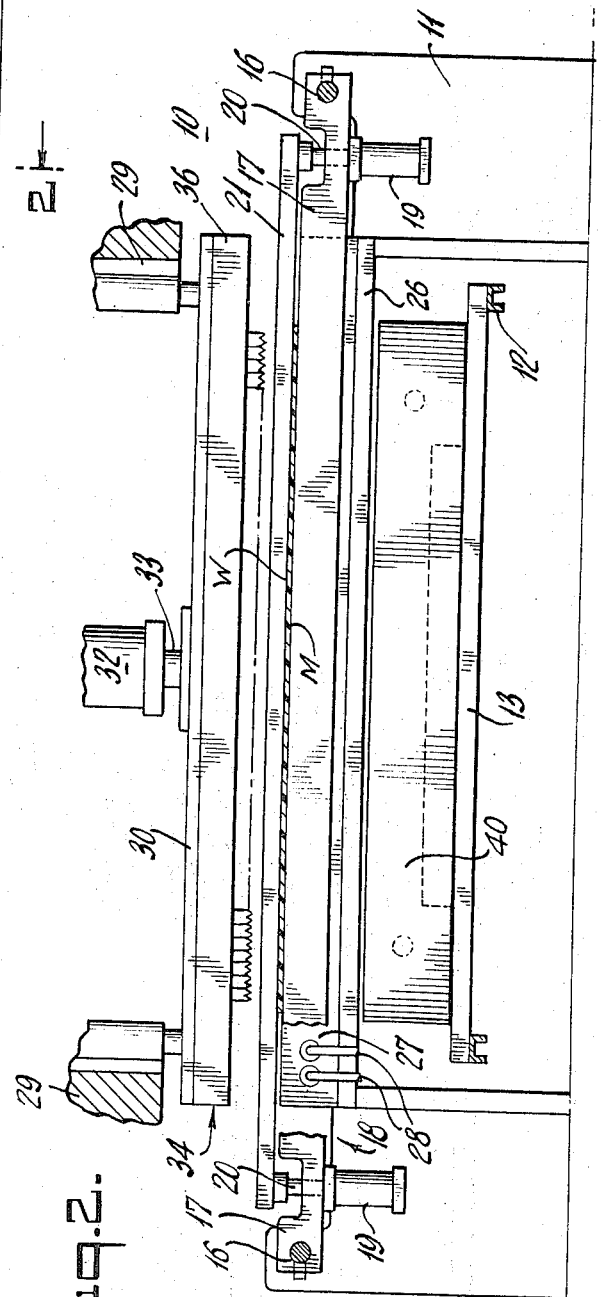
INVENTOR
LAWRENCE HARGETT
BY Stanley Wolder
ATTORNEY

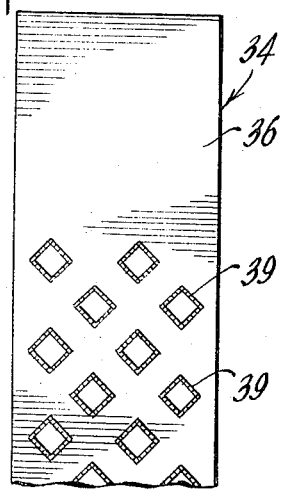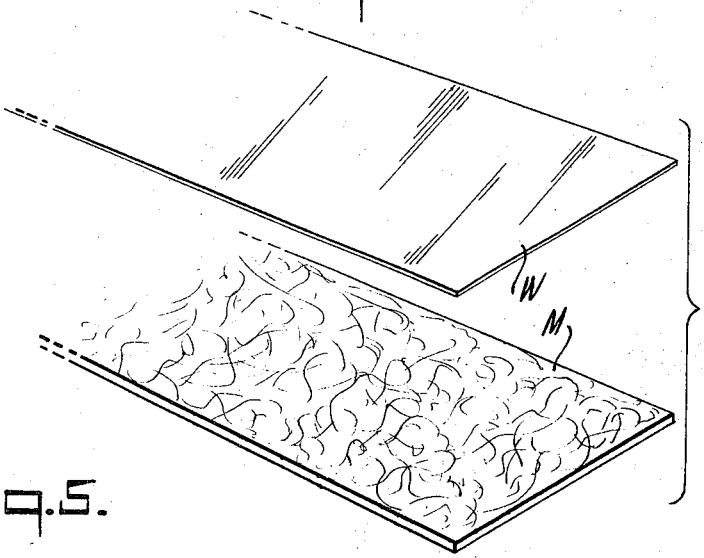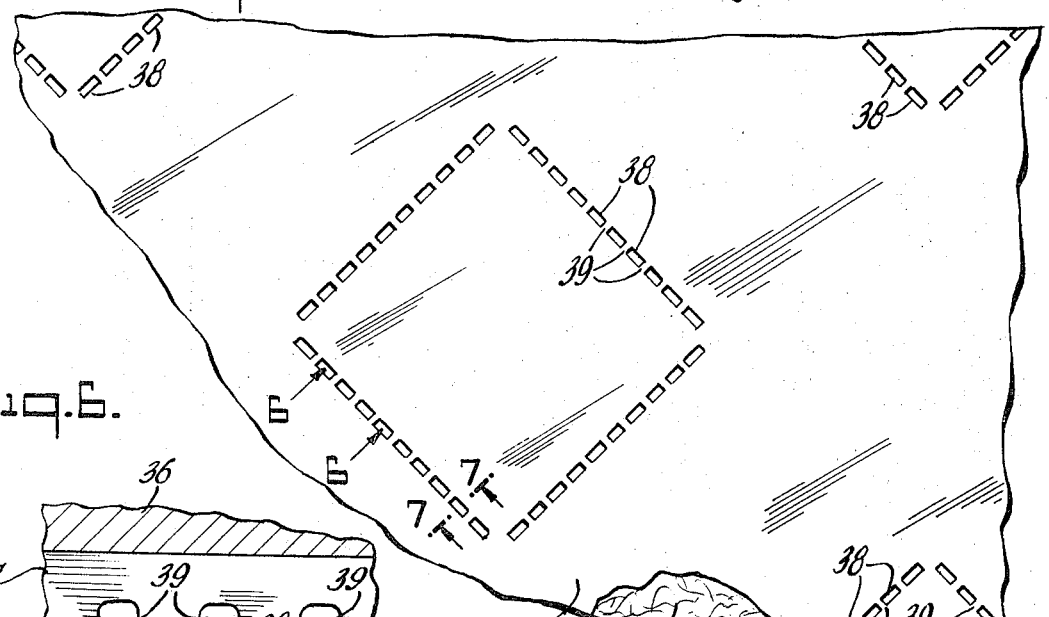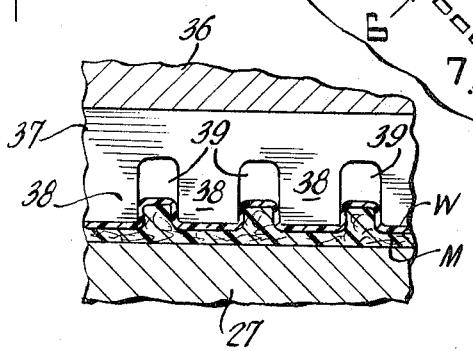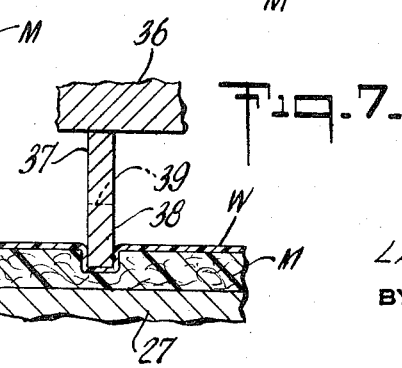
INVENTOR
LAWRENCE HARGETT
BY Stanley Wolder
ATTORNEY

United States Patent Office 3,823,052
Patented July 9, 1974

3,823,052
QUILTED FABRIC AND METHOD OF
PRODUCING THE SAME
Lawrence Hargett, Englewood, N.J., assignor to Philmont
Manufacturing Company, Englewood, N.J.
Application Oct. 1, 1969, Ser. No. 868,959, which is a continuation-in-part of application Ser. No. 798,674, Feb. 12, 1969, both now abandoned. Divided and this application May 18, 1972, Ser. No. 254,801
Int. Cl. B31f 7/00
U.S. Cl. 156—220    9 Claims

ABSTRACT OF THE DISCLOSURE

A quilted fabric is produced by laminating a web of nylon or other fiber having a thermoplastic polymeric face with active polar groups along the polymer chain and a lofty non-woven resilient mat of fibers having a highly polar thermoplastic binding resin and compressing and dielectrically heating the laminate along puff delineating lines to a temperature sufficient to bond the web and mat materials. Examples of polar groups are hydroxyl, nitrile, amide, mono-carboxy and isocyanate.

---

This is a division of application Ser. No. 868,959, filed Oct. 1, 1969 now abandoned, which application is a continuation-in-part of application Ser. No. 798,674, filed Feb. 12, 1969, also abandoned.

BACKGROUND OF THE INVENTION

The present invention relates generally to improvements in webs and their production and it relates particularly to an improved quilted fabric and method of producing the same.

Quilted fabrics are conventionally produced by sandwiching a lofty resilient non-woven fibrous mat or fiber-fill between a pair of webs which may be knitted, woven or of other construction and sewing the webs together through the mat along lines defining a desired pattern. The fiber-fill is compressed along the pattern defining stitching and delineates the puffed areas of the quilted fabric. This method of producing quilted fabrics possesses many drawbacks and disadvantages and the quality of the end product leaves much to be desired, lacking in uniformity and being frequently defective. The production method is time consuming and expensive, requiring highly skilled labor and is of little versatility and adaptability and of limited application.

Many quilted constructions in general use are designed so that the face fabric and fiber-fill are of different fiber types to take maximum advantage of each fiber's properties. For instance, a polyester fiber-fill is widely used because the fiber may be permanently crimped resulting in a more lofty or bulky web per pound than other fibers. Nylon is often chosen for the face fabric because of its strength and general wearability. This difference in fiber types creates a problem in trying to dielectrically weld them however, in that fibers vary greatly in softening or melting temperature and if the melt weldingpoint were reached in one it wouldn't necessarily be reached in the other creating an unacceptable bond or melting the face and damaging it.

SUMMARY OF THE INVENTION

It is a principal object of the present invention to provide an improved method for the production of composite webs and the resulting product.

Another object of the present invention is to provide an improved method for the production of quilted fabrics and an improved quilted fabric.

Still another object of the present invention is to provide an improved quilted fabric having a facing web and fiber-fill formed of materials possessing different properties and characteristics in which sewing or stitching are absent and to an improved method of producing the same.

A further object of the present invention is to provide an improved bonding process.

Still a further object of the present invention is to provide a method of the above nature characterized by its versatility, adaptability and reliability and to the improved product produced thereby characterized by its low cost, attractive appearance and high quality.

The above and other objects of the present invention will become apparent from a reading of the following description taken in conjunction with the accompanying drawing which illustrates the improved product and an apparatus which may advantageously be employed in practicing the improved process.

In a sense the present invention contemplates the method of producing a quilted fabric comprising the steps of laminating a web having a thermoplastic organic polymeric outer face with polar moieties onto a lofty resilient, compressible non-woven mat of fibers having organic polymeric outer-faces with polar moieties, compressing said laminated web and mat along areas delineating the puffed areas of said quilted fabric and heating said fibers and web at said compression areas to a temperature sufficient to bond the faces of said fibers and web in said areas to retain them in their compressed state.

The compression areas are advantageously defined by continuous or by stitch simulating broken lines and a facing as well as a backing web may be employed between which the fiber-fill or mat is sandwiched. The webs are advantageously woven or knitted and are formed at least in part of synthetic thermoplastic fibers, as is the fiber-fill mat. The outer faces of the fibers forming the web and the fiber-fill contain highly polar branched chain polymers or copolymers whereby the raising of the temperature of the material forming these outer faces will effect a fusion of the polymers thereof at temperatures below the melting or welding points of the thermoplastic fibers so that the cloth is not appreciably weakened. The outer faces are so formed with or applied to the fibers as to be substantially integral therewith.

Some suitable examples of these polar modified polymers are the hydroxy, carboxy or amide modified acrylics and nitriles and the polyester urethanes in which the isocyanate lends polarity. Commercially available latices of these polymers are B. F. Goodrich's Hycar acrylics numbers 2671, 2600 x 83, 2600 x 92 and others and Goodrich's nitriles, numbers 1571, 1572, 1570 x 20 . . . Urethane latices are available from Wyandotte Chemical Co. and are designated E-207A, X-1017, X-1023 . . . In addition to latices, thermoplastic solution grade resins of the saturated polyester and polyurethane types are highly polar and are applicable as a fiber coating. B. F. Goodrich's "Estane" series would typify the polyurethane type and U. S. M. Polymer's "$C_2P$-40" polyester series the saturated polyester type.

The outer face may be applied to the fibers and serve many functions. For example in the fiberfill mat the outer face material may function as the interfiber binder in the production of the non-woven mat. In the webs the outerface material may serve as either a hand-modifier in the textile finish or a waterproof back coating.

The improved process also contemplates the high frequency heating of the compressed areas and these areas should consequently possess a sufficiently high dielectric loss factor at the frequencies employed, at either ambient temperatures or at suitable preheated temperatures. Also contemplated by the present invention is the procedure employed in heating the web and fiberfill to their bonding temperature in which the compressed areas are initially conduction heated by the electrode defining heated compression dies. In addition, before the application of the full high frequency heating power a lower intensity high frequency field is applied to further raise the temperature of the compressed material and increase the dielectric loss factor thereof prior to the application of full power.

The improved process permits the production of non-stitched quilted fabrics having webs and fiberfill of different melting points and other properties and is applicable to wide width fabrics. The process is rapid, economic and highly reliable and is of great versatility and adaptability. The resulting product is inexpensive, attractive, highly durable and of uniformly high quality.

BRIEF DESCRIPTION OF THE DRAWINGS

FIG. 1 is a side fragmentary elevational view of an apparatus employed to advantage in the present process;

FIG. 2 is a sectional view taken along line 2—2 in FIG. 1;

FIG. 3 is a sectional view taken along line 3—3 of FIG. 1;

FIG. 4 is an exploded perspective view of the layers forming the improved quilted fabric;

FIG. 5 is a fragmentary plan view of the apparatus electrode defining upper pressure die;

FIG. 6 is an enlarged sectional view as taken along the line 6—6 in FIG. 5 illustrating the assembly of the layers in the forming of the quilted fabric; and FIG. 7 is a view similar to FIG. 6 taken along line 7—7 in FIG. 5.

DESCRIPTION OF THE PREFERRED EMBODIMENTS

Referring now to the drawings and particularly FIGS. 1 to 3 and 5 to 7 thereof, the reference numeral 10 generally designates an apparatus which may be employed to advantage in practicing the improved method. The apparatus 10 comprises a base including a pair of longitudinally spaced parallel vertical end plates 11 connected by transversely spaced longitudinal channel members 12 supporting shelf defining members 13. Transversely spaced pairs of longitudinally aligned openings are formed in the upper borders of plates 11 and engage slide bushings 14.

A pair of longitudinal slide rods 16 engage the bushings 14 and support a pair of longitudinally spaced parallel transverse cross bars 17 which are individually adjustable along the lengths of slide bars 16 and define therewith a reciprocating carriage 18. Mounted proximate the opposite ends of each cross bar 17 is a depending vertical hydraulic or pneumatic cylinder 19 provided with an upwardly projecting piston rod 20. A clamp bar 21 disposed above and parallel to each cross bar 17 extends between and is affixed to a corresponding pair of piston rods 20. Supported by a bracket 22 on the outside face of an end plate 11 is a longitudinal horizontal hydraulic or pneumatic cylinder 23 provided with a piston rod 24 connected to the slide rods 16. The cylinders 19 and 23 are connected to pressurized air or hydraulic fluid through any suitable valve and timing network so as to effect a repetitive web increment web advancing cycle in which the clamp bars 21 are closed by cylinders 19 when the piston rod 24 is in its retracted condition, the piston rod 24 is advanced to advance the carriage 18 the clamp bars 21 are opened by cylinders 19, the carriage 18 retracted by cylinder 23 and the cycle then repeated. There is a dwell period when the clamp bars 21 are closed in their carriage advanced or retracted position to permit the operation on on increment of the handled web.

A split stationary bed defined by members 26 is suitably supported on the ground and below the carriage 18. Mounted atop the bed 26 are a pair of longitudinally spaced transversely extending parallel lower stationary platens 27 having horizontal flat top faces substantially coplanar with the flat faces of the cross bars 17. The platens 27 are heated to an adjustable regulated predetermined temperature by circulating heated fluid through conduits therein by way of pipes 28 or in any other suitable manner.

Supported for vertical movement above the platens by transversely spaced track members 29 is a transversely extending horizontal platen. A vertical hydraulic cylinder is medially positioned above the platen 30 and includes a piston rod 33 connected to the top of platen 30. The cylinder 32 is connected to a pressurized fluid through a time valving mechanism synchronized with the carriage 18 so as to lower the platen 30 during the retraction period of carriage 18 and to maintain the platen 30 in a raised position during the web advancing cycle of the carriage 18.

Mounted on the underface of movable platen 30 in vertical alignment with the platens 27 are a pair of longitudinally spaced dies 34 which may likewise be heated in the manner of platens 27. Each of the dies 34 includes an upper block or base section 36 and a lower electrode defining pressure applying section 37. The lower section 37, in the illustrated form, includes vertical metal strips 38 depending from the under faces of the die upper sections 36 and positioned to form or define regularly spaced diagonally arranged squares 39, it being noted that the lower section 37 may be in any desired pattern. The bottom edges of the strips 38 lie in a common horizontal plane and they are interrupted by regularly spaced recesses 39 formed in the underfaces of strips 38, the recesses aggregate length preferably being a minor part of the length of the strips 38. A high frequency RF oscillator 40 of the type conventionally employed in high frequency dielectric heating, for example of a frequency between 30 and 100 mHz. is mounted on the shelf 13 and connected to a suitable power supply. The ground terminal of oscillator 40 is connected to bed 26 and platens 27 and the oscillator hot terminal is electrically connected to the die sections 37 which define the hot electrodes. The power output of oscillator 40 may be adjusted to different levels and may be timed in any suitable manner in synchronism with the lower of the platen 30.

In practicing the improved method with the apparatus 10, a woven, knitted or otherwise constructed web W and a lofty resilient non-woven fibrous mat or fiberfill M, are drawn from corresponding rolls thereof and extend in longitudinally superimposed relationship along the length of the carriage 18 between the cross bars 17 and the clamping bars 21 and between the upper dies 34 and lower platens 27 to a suitable take-up roll for the finished quilted fabric. The web W and mat M possess the properties and have been treated in the manner herein set forth. The clamp bars 21 are lowered to engage the web mat laminate and the carriage 18 advanced are increment equal to twice the longitudinal dimension of a die 34, the platen 30 lowered to press the lower die section 37 into the web mat laminate and the oscillator 40 is energized at its lower preheat level to heat the compressed areas of the web mat laminate for a pre-determined period to heat these compressed areas by conduction from the heated dies and by dielectric losses to increase the dielectric loss factors thereof. The oscillator 40 is then switched to full power for a time sufficient to bond the web W and the mat fibers at the compressed areas thereof without melting the mat fibers or web. The oscillator 40 is then de-energized, the platen 30 raised, the carriage 18 advanced and the cycle repeated to quilt a succeeding increments of the web mat laminate.

The web W is advantageously formed in whole or in part of synthetic organic thermoplastic fibers advantageously possessing relatively high dielectric loss factors at the high frequency fields employed at ambient or at the preheated temperatures so to permit the rapid interfacial bonding of the web and mat fiber by the present process. Examples of synthetic fibers which may be employed to advantage are such types as the acrylic and modacrylic, such as those formed from polymerized acrylonitrile with the nitrile polar groups spaced along the molecule, and polymerized acrylonitrile and vinyl chloride which has chlorine and nitrile groups along the polymer, polyester, nylon 6 and nylon 66 types of fibers. These fibers are woven or knitted either alone or as a blend with other fibers which may be of a non-thermoplastic type or may possess a low dielectric loss factor. The desirable fibers are produced from monomers whose molecules possess terminal carboxylic acid, amino, hydroxyl, nitrile, chlorine or other halogen and similar active moieties.

The web W may be finished with a conventional softener in the known manner. Examples of such softeners are Polosan-S—Polyethylene Emulsion—Refined Onyx Co.—Avitex-NA—Du Pont. The web W may also be treated with water repellants and/or hand modifiers prior to lamination but such treatments should be with thermosetting type resinous water repellants and hand modifiers either of the thermosetting or thermoplastic resin type. Examples of water repellants and hand modifiers which may be employed are the stearamide type thermosetting water repellants (Refined-Onyx Co.-Drilene L), melamine formaldehyde thermosetting type hand modifiers (for example, Refined-Onyx, Permaset 1300, American Cyanamid Cymel 300, 301) and polar polymeric additives such as urethane latices (Wyandotte E–207-A, X–1017 . . .) and acrylic thermoplastic types (Hycar Acrylic No. 2671, 2600 x 83, 2600 x 92 and others).

Waterproof back coating for a waterproof quilted fabric is advantageously formed of a urethane (B. F. Goodrich's Estane series) polymer base and may be compounded for increased water vapor transmission rate. The fabric is first dyed to shade, back-coated and then finished with a water repellant face which is usually of the silicone type but may be any water repellant. The back coating may also be of the two pass variety, wherein a thermosetting urethane first coat and thermoplastic top coat is applied.

In addition to supplying the outer face material to the fibers in the web by conventional textile coating, dipping and spraying techniques, this material may be supplied to the fibers directly by coextrusion when the fiber is formed. This technique involves extruding a core fiber of a higher melting point than the envelope fiber. Nylon 6 or 66 core fiber is applicable as the core Nylon 11 or 12 will serve as the envelope or outerface for nylon. Similarly a polyester core fiber such as "Dacron" or "Kodel" may serve as a base for coextrusion with a modified polyester such as U.S.M. Polymer's $C_2P$–40 series or a urethane.

The mat or fiberfill M is produced with conventional equipment such as a Curlator Rando Web machine. While any suitable fiber may be used in the mat M they are preferably chosen from those listed above for the web W and a polyester fiber is used in whole or in part to great advantage.

The binder in the non-woven fiberfill advantageously is either of the urethane, acrylic or nitrile type. The acrylic binder preferably contains a large portion of polyacyl acrylate and is a copolymer containing approximately 5% of a functional monomer which may include either a hydroxyl, amino, or mono-carboxy acid. The nitrile binder advantageously is a copolymer of butadiene and acrylonitrile with a major portion of the polymer being butadiene. This copolymer preferably contains less than 10% of functional monomer which may include either a hydroxyl, amino, or mono-carboxy acid. The urethane is a fully reacted polyester type—Wyandotte E 207A, X–1017m, X–1023. Some commercially available forms of these binders are Goodrich's Hycar Acrylic latex numbers 2671, 2600 x 83, 2600 x 92 and others and Hycar nitrile latex numbers 1571, 1572, 1570 x 20, and others.

A second approach to manufacturing the fiberfill so that it will have an adhesive available for dielectric bonding is to intimately blend a low melting point adhesive extruded as fiber with the fiberfill material when the fiberfill is made. The solution grade polymers mentioned above are all applicable for this purpose as are the nylons 11 and 12.

The polar groups in the fiber and binder polymer chains greatly increase the strength of the secondary or intermolecular electrostatic forces which are formed between these polymers. It is believed that the quilting bond is produced by the strong intermolecular forces created by the polar groups when the thermoplastic resin is fused in intimate contact with the fibers as the dielectric field is applied to the quilting press.

In joining the laminated web W and mat M and imparting the quilting thereto by means of the apparatus 10, the process is advantageously threefold as set forth above.

The first heating of the material is accomplished by conduction as the controlled temperature heated bottom platens 27 and upper quilting dies 34 of the press are closed on the laminated material. Simultaneously with this, a low power dielectric heating radio frequency field is introduced across the dies. Heat is developed in the laminated material between the lowered upper quilting die sections 37 and lower platens 27 so that the pattern forced into the laminated material by the press against the die is heated. Both these steps act as a preheating and conditioning of the material by raising the temperature dependent loss factor. This in turn permits the third step or high power dielectric heating radio frequency field to raise the fibers and polymer binder to fusion temperature levels in the quilting pattern leaving a permanently quilted structure. Such high power is applied so as to raise the temperature of the quilt to between 50° F. and 100° F. below the melting points of the fibers.

The following examples are given merely by way of illustration of the improved method and are not intended as limitations thereof. In these examples the dimensions of the confronting or pressure faces of each of the upper and lower dies 34 and platen 27 were 6 inches by 72 inches and the oscillator frequency was between 30 MHz. and 100 MHz.

EXAMPLE I

A quilted lounging robe fabric was produced in which the Web W was a nylon type 6 or 66 trice face fabric and the fiberfill or mat M was of polyester. The nylon trice fabric was dyed, treated with a textile softener as above set forth and heat set to width as a finishing procedure.

The polyester fiber was made into the fiberfill M on a Curlator Rando Web machine as the web laying device and sprayed with Hycar Acrylic #2671 (B. F. Goodrich), a carboxy modified heat reactive acrylic latex at 20% solids add on to a finished 3.3 oz. per lineal yard, 60 inch width, 0.5 inch high polyester and binder combination.

The web W and mat M were then fed as a laminate into the press 10 with the web W on top facing the quilting die 34. The upper and lower platens were both heated to 320° F. This heat was chosen from a range of 200° F. to 400° F. as being adequate to achieve a bond while still being safe for the fabric. A press cycle of 1 second pre-seal, 1.5 seconds full power high frequency field and 0.75 seconds dwell was used out of a possible range of 0–6 seconds for each step. The power level and time for the pre-seal step depends on the material type and dielectric properties, thickness of the quilt and temperature of the die and is easily and readily determined for each combination. 30% of full power level was found to be satisfactory in the present example. The full power radio frequency field applied to the material was drawn from a 45 kw. generator at a 65% duty cycle at 50 MHz. over a quilted area of 600 square inches. The power setting was 25% short of full power. Too high a power setting will burn the material while too low a setting will result in a weak bond. The upper limit of this time cycle is approximately 37 kw. while the lower limit would be about 29 kw. The amount of power the material dissipated as heat to achieve the bond is again dependent on the mass and dielectric properties of the material and temperature of the die.

EXAMPLE II

A quilted double knit outerwear fabric was produced from a web W of 50% Creslan/50% Avril (Avril is not bondable) and a polyester fiberfill M with the same general web finishing described above but with a 0.75 inch high 4.4 ounce polyester mat M instead of the 3.3 ounce polyester mat of Example I. While the temperature was maintained at that of Example I it could be safely raised to 450° F. The time cycles were the same as in Example I but the full high frequency power was raised to 37 kw.

EXAMPLE III

Bed pad quilting was made from both 100% woven modacrylic and 50% modacrylic/50% cotton woven blend with 50% polyester/50% modacrylic and 100% polyester fiberfill. The face and bottom fabric were dyed white only with no resin finishing. The fiberfill of both types was produced on a card as the web laying device and sprayed with Hycar Nitrile 1571 binder. A 4.4 oz. mat similar to that in Example II was used. Two webs W with the fiberfill M sandwiched therebetween were fed into the press 1. The platens were heated to 200° F. A 1 second pre-seal, 1 second RF and 1 second dwell was found to be highly satisfactory for sealing and quilting. The high frequency power was employed at several levels and depends largely on the degree of plastic flow of the modacrylic fiber to eliminate hardness around the seal edges if too much heat is applied. Optimum power levels are easily and readily determined in each case.

While there have been described and illustrated preferred embodiments of the present invention, it is apparent that numerous alterations, omissions and additions may be made without departing from the spirit thereof. For example webs W may be applied to one or both sides of the fiberfill M and these may be of the same of different constructions and compositions.

What is claimed is:

1. The method of producing a quilted fabric containing line delineated puffed areas comprising the steps of laminating a web having a thermoplastic organic polymeric outer face with polar moieties onto a lofty, resilient, compressible non-woven fibrous mat containing throughout the full thickness thereof intermeshing fibers having outerface defining coating formed of an organic polymeric resin of different composition than said fibers and with polar moieties, compressing said laminated web and mat along said lines delineating said puffed areas of said quilted fabric, and high frequency dielectric heating said fibers and web only at said compression areas to a temperature below the fusion point of said fibers and sufficient to react said polar moieties to bond said outerfaces of said fibers and web only in said compression areas to retain them in their compressed state and leaving the fibers in the puffed area in an expanded state.

2. The method of claim 1 wherein said temperature is between 50° F. and 100° F. below the melting points of the materials of said web and mat fibers.

3. The method of claim 1 wherein said reactive polar moieties are selected from the class consisting of hydroxyl, nitrile, amide, mono-carboxy, isocyanate and chlorine.

4. The method of claim 1 wherein said compression is effected in part by subjecting said mat and web at said heated by high frequency dielectric heating to an initial temperature between 50° F. and 100° F. below said bonding temperature and then heated to said bonding temperature.

5. The method of claim 4 wherein said preheating is effected in part by subjecting said mat and web at said compression lines to a high frequency electric field at a first intensity and then raising to temperature of said mat and web at said compression lines to said bonding temperature at an increased high frequency electric field intensity.

6. The method of claim 1 wherein said fibers include thermoplastic cores and thermoplastic sheaths enveloping said cores and of higher melting point than said cores and said temperature is below the melting point of said cores.

7. The method of claim 1 wherein said web is provided with a thermoset resin layer having an outer coating of a thermoplastic organic polymer including polar moieties.

8. The method of producing a quilted fabric comprising forming a lofty non-woven fiber mat containing throughout the full thickness thereof thermoplastic fibers provided with outer coatings of an organic polymer of a material different than that of said fibers and containing polar moieties compressing said mat at spaced points, and heating said mat by high frequency dielectric heating only in the areas of said spaced points to a temperature below the fusion temperature of said fibers to effect the reaction and fusion of said polar moieties and the consequent bonding of said coatings only at said points of compression and leaving the fibers in the areas between said compression points in an unbonded expanded state.

9. The method of claim 8 wherein said coatings bond said mat fibers at the points of intersection thereof.

References Cited

UNITED STATES PATENTS

| | | | |
|---|---|---|---|
| 3,180,782 | 4/1965 | Coates et al. | 156—307 X |
| 3,449,486 | 6/1969 | Contractor et al. | 161—170 X |
| 3,558,429 | 7/1968 | Spence | 161—157 X |
| 3,232,819 | 2/1966 | Satas | 161—157 X |
| 3,446,685 | 5/1969 | Goldstone et al. | 156—219 |
| 3,354,020 | 11/1967 | Copeland | 156—273 X |
| 2,816,054 | 12/1957 | Howden | 156—220 X |
| 3,046,173 | 7/1962 | Copeland | 156—209 X |
| 3,044,914 | 7/1962 | Bell et al. | 156—219 X |
| 3,375,156 | 3/1968 | Edgar | 156—219 X |
| 3,405,674 | 10/1968 | Coates et al. | 161—120 X |

CHARLES E. VAN HORN, Primary Examiner

D. A. SIMMONS, Assistant Examiner

U.S. Cl. X.R.

156—209, 273, 290; 161—146, 150, 156, 170; 264—293